US010702863B2

(12) United States Patent
Brown et al.

(10) Patent No.: US 10,702,863 B2
(45) Date of Patent: Jul. 7, 2020

(54) WATER SOFTENING COMPOSITIONS

(71) Applicant: Compass Minerals America Inc., Overland Park, KS (US)

(72) Inventors: Geoffrey A. Brown, Overland Park, KS (US); Kristopher Lee Shelite, Moundridge, KS (US); Darlene R. Linscott, Kansas City, MO (US); Jerry L. Poe, Hutchinson, KS (US)

(73) Assignee: Compass Minerals America Inc., Overland Park, KS (US)

( * ) Notice: Subject to any disclaimer, the term of this patent is extended or adjusted under 35 U.S.C. 154(b) by 0 days.

(21) Appl. No.: 16/044,642

(22) Filed: Jul. 25, 2018

(65) Prior Publication Data

US 2018/0326411 A1 Nov. 15, 2018

Related U.S. Application Data

(63) Continuation of application No. 14/461,058, filed on Aug. 15, 2014, now Pat. No. 10,173,214.

(60) Provisional application No. 61/866,406, filed on Aug. 15, 2013.

(51) Int. Cl.
| | | |
|---|---|---|
| *B01J 49/05* | (2017.01) | |
| *C02F 1/42* | (2006.01) | |
| *B01J 49/60* | (2017.01) | |
| *C02F 1/68* | (2006.01) | |
| *B01J 49/53* | (2017.01) | |
| *B01J 39/07* | (2017.01) | |

(52) U.S. Cl.
CPC ............... *B01J 49/05* (2017.01); *B01J 39/07* (2017.01); *B01J 49/53* (2017.01); *B01J 49/60* (2017.01); *C02F 1/42* (2013.01); *C02F 1/683* (2013.01); *C02F 2001/425* (2013.01); *C02F 2303/16* (2013.01); *Y02W 10/37* (2015.05)

(58) Field of Classification Search
CPC .. B01J 39/046; B01J 49/0069; B01J 49/0078; C02F 1/42; C02F 1/683; C02F 2001/425; C02F 2303/16; Y02W 10/37
See application file for complete search history.

(56) References Cited

U.S. PATENT DOCUMENTS

| | | | |
|---|---|---|---|
| 2,769,787 A | 11/1956 | Diamond | |
| 4,071,446 A | 1/1978 | Kunin | |
| 4,116,860 A | 9/1978 | Kunin | |
| 4,540,715 A * | 9/1985 | Waatti | B01J 49/60 521/26 |
| 4,664,811 A | 5/1987 | Operhofer | |
| 4,860,829 A | 8/1989 | Carlberg et al. | |
| 5,665,783 A | 9/1997 | Katzakian, Jr. et al. | |
| 6,340,712 B1 | 1/2002 | Kunin et al. | |
| 2006/0157415 A1 | 7/2006 | Koefod | |
| 2010/0140178 A1 | 6/2010 | Thimmesch et al. | |
| 2012/0241382 A1 * | 9/2012 | Brown | C02F 1/42 210/665 |

FOREIGN PATENT DOCUMENTS

| | | |
|---|---|---|
| JP | 60-255147 | 12/1985 |
| JP | 2000-005762 | 1/2000 |

OTHER PUBLICATIONS

International Search Report and Written Opinion dated Nov. 12, 2014 in PCT/US2014/051359 filed Aug. 15, 2014.
Machine Translation in English of JP2000-005762, 12 pages.
Office Action dated Jan. 20, 2016 in corresponding U.S. Appl. No. 14/461,058, filed Aug. 15, 2014.
Office Action dated Aug. 12, 2016 in corresponding U.S. Appl. No. 14/461,058, filed Aug. 15, 2014.
Office Action dated Jun. 2, 2017 in corresponding U.S. Appl. No. 14/461,058, filed Aug. 15, 2014.
Office Action dated Jan. 25, 2018 in corresponding U.S. Appl. No. 14/461,058, filed Aug. 15, 2014.

* cited by examiner

*Primary Examiner* — Bobby Ramdhanie
*Assistant Examiner* — Donovan Bui-Huynh
(74) *Attorney, Agent, or Firm* — Hovey Williams LLP

(57) ABSTRACT

Novel water softening products and methods of treating hard water are provided. The products comprise a salt and a metal chelating agent. The products are useful for regenerating ion exchange material in a water softening system and providing softened water containing both sodium and potassium ions, while having dramatically increased efficiencies over prior art products.

5 Claims, No Drawings

WATER SOFTENING COMPOSITIONS

RELATED APPLICATION

The present application is a continuation application of pending U.S. patent application Ser. No. 14/461,058, filed Aug. 15, 2014, entitled WATER SOFTENING COMPOSITIONS AND METHODS, incorporated by reference herein. The '058 application claims the priority benefit of U.S. Provisional Patent Application Ser. No. 61/866,406, filed Aug. 15, 2013, entitled WATER SOFTENING COMPOSITIONS AND METHODS, incorporated by reference in its entirety herein.

BACKGROUND OF THE INVENTION

Field of the Invention

The present invention relates to an improved composition for use in water conditioning systems that increases the efficiency of the system.

Description of the Prior Art

While potable water is safe to drink and useful for any number of household and commercial applications, it's likely to contain a number of dissolved substances. The levels of two of these dissolved substances, $Ca^{2+}$ and to a lesser degree $Mg^{2+}$, contribute to what is known as water hardness. Hard water is defined as having 7 to 10.5 grains per gallon of $CaCO_3$, or 120 to 180 ppm calcium hardness (also expressed as $CaCO_3$).

Although hard water is not toxic, it causes problems in household and industrial fixtures such as hot water heaters, plumbing, boilers, and heat exchangers. This is due to the low solubility of calcium and magnesium carbonates, and their tendency to precipitate onto surfaces and form scale. Over time, scale buildup can restrict flow in pipes and plumbing, and damage or reduce the efficiency of equipment such as hot water heaters. To compensate for the undesirable effects of hard water, water softening devices are routinely used to remove $Ca^{2+}$ and $Mg^{2+}$ ions from water via a process known as ion exchange. The softening process is beneficial and desirable since it helps protect equipment from the damaging effects of scale accumulation. Hard water can cause a variety of problems related to cleaning and appliance use, and can also clog showerheads.

Water softeners work by passing hard water through a material known as a cation exchange resin. The resin has copious negatively-charged (anionic) functional groups that bind to positively-charged substances (cations), such as calcium and magnesium ions. Over time, the resin becomes saturated with cations and loses its capacity to remove additional $Ca^{2+}$ and $Mg^{2+}$ ions from the source water. Therefore, the resin has to be regenerated by flooding the water conditioner with another cation (typically $Na^+$ or $K^+$), which exchanges with the trapped $Ca^{2+}$ and $Mg^{2+}$ ions.

The water softening industry has addressed the impact of unwanted ions (i.e., sodium and chloride) discharged into the environment by promoting use of 'high efficiency' water softeners. Unlike traditional water softeners, high efficiency units incorporate technologies that can allow them to meter the appropriate amount of salt that a particular household actually needs. Therefore, the salt is used more efficiently since the minimum amount of salt is used to regenerate only the expended resin. However, a drawback of high efficiency softeners is that they can cost several hundred dollars more than traditional units. As a result, they may be cost prohibitive to a large number of households.

The present invention is advantageous since it captures the environmental benefits derived by increased efficiency (reduction in sodium and chloride discharge) without requiring the homeowner to purchase expensive equipment. That is, increased efficiency is achieved with convention water softening equipment.

SUMMARY OF THE INVENTION

The present invention broadly provides a method of increasing the efficiency of a salt at treating water. In one embodiment, the method comprises contacting an ion exchange material with an aqueous solution or dispersion comprising the salt and a metal chelating agent to yield a regenerated ion exchange material. During the contact, at least about 50% more metal ions are removed than under the same conditions but in the absence of the metal chelating agent.

In another embodiment, the method comprises contacting an ion exchange material with an aqueous solution or dispersion comprising the salt and a metal chelating agent to yield a regenerated ion exchange material. The metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis (o-aminophenoxy)ethane-N,N,N',N'-tetraacetate, sulfonated polycarboxylate copolymers, polymethacrylate, and mixtures thereof.

In a further embodiment, the method comprises contacting an ion exchange material with an aqueous solution or dispersion comprising the salt and a metal chelating agent to yield a regenerated ion exchange material. The metal chelating agent is present in the aqueous solution or dispersion at levels of less than about 75 ppm, based on the salt.

The invention also provides a novel salt product comprising a metal chelating agent intermixed with a salt. The metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis(o-aminophenoxy)ethane-N,N,N,N'-tetraacetate, sulfonated polycarboxylate copolymers, polymethacrylate, and mixtures thereof. The salt is selected from the group consisting ofNaCl, KCl, $K_2SO_4$, $NaHCO_3$, $Na_2SO_4$, $NaH_2PO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof.

In a further embodiment, the invention provides an aqueous dispersion or solution comprising a metal chelating agent and a salt. The metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis(o-aminophenoxy)ethane-N,N',N'-tetraacetate, sulfonated polycarboxylate copolymers, polymethacrylate, and mixtures thereof. The salt is selected from the group consisting of NaCl, KCl, $K_2SO_4$, $NaHCO_3$, $Na_2SO_4$, $NaH_2PO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof.

DETAILED DESCRIPTION OF THE PREFERRED EMBODIMENTS

In more detail, the present invention is concerned with a salt product comprising a salt and a metal chelating agent, as well as a method of softening water using that product. The product preferably comprises from about 80% to about 99.5% by weight salt, more preferably from about 90% to about 99% by weight salt, and even more preferably from about 95% to about 99% by weight salt, based upon the total weight of the product taken as 100% by weight. The product also preferably comprises from about 0.5% to about 20% by weight metal chelating agent, more preferably from about 0.1% to about 10% by weight metal chelating agent, and even more preferably from about 0.1% to about 5% by weight metal chelating agent, based upon the total weight of the product taken as 100% by weight. The weight ratio of salt to metal chelating agent in the product is preferably from about 4:1 to about 10,000:1, more preferably from about 100:1 to about 10,000:1, and even more preferably from about 500:1 to about 10,000:1.

Suitable salts include chloride-containing salts, as well as chloride-free salts such as metal sulfates, metal phosphates, and/or metal carbonates (preferably a Group 1 or II metal sulfate, carbonate, or phosphate). Particularly preferred such salts include those selected from the group consisting of NaCl, KCl, $K_2SO_4$, $NaHCO_3$, $Na_2SO_4$, $NaH_2PO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof.

Suitable metal chelating agents include any that are capable of binding with the target metal cations. Particularly preferred metal chelating agents include calcium chelating agents (i.e., one that binds with calcium) and/or magnesium chelating agents. Metal chelating agents for use in the present invention can be selected from the group consisting of monomeric, oligomeric, and polymeric compounds comprising anionic moieties. The anionic moiety is preferably selected from the group consisting of carboxylate, phosphonate, and sulfonate moieties. Furthermore, more than one anionic moiety may be present on a particular compound.

Aliphatic acids can also be used as metal chelating agents in the present invention. Suitable aliphatic acids include those selected from the group consisting of citric acid, acetic acid, ascorbic acid, salicylic acid, and mixtures thereof. Some particularly preferred metal chelating agents are selected from the group consisting of sodium succinate, potassium succinate, sodium citrate, potassium citrate, polyacrylic acid, polymaleic acid, polyaspartic acid, polymers containing more than one type of anionic chelating moiety, aspartate, maleate, ethylenediamine tetraacetate, ethylene glycol tetraacetate, polyacrylate, polymaleate, polymerized amino acids (e.g., polyaspartate, polyglutamate), 1,2-bis(o-aminophenoxy)ethane-N,N,N',N'-tetraacetate, sulfonated polycarboxylate copolymers, and polymethacrylate.

The product can be prepared by physically mixing the salt and metal chelating agent in the desired amounts to create a substantially homogenous blend of the two, where each component is uniformly intermixed. That is, the ingredients (when solids) can be individually provided as discrete pieces (i.e., in particulate form, such as salt pellets, cubes, granules, or crystals), which can then be physically or mechanically mixed together, bagged, and sold. Alternatively, the product can also be provided in the form of a self-sustaining body comprising the salt and metal chelating agent compacted together into a single salt product. The compacted product can then be provided in the form of pellets, cubes, granules, pieces, or crystals, where each pellet, cube, etc., comprises a compacted admixture of the salt to metal chelating agent. Suitable methods of compacting are known in the art (see e.g., U.S. Pat. No. 7,758,770, incorporated by reference herein in its entirety). The salt and metal chelating agent are preferably substantially uniformly dispersed or intermixed in the compacted salt product.

A number of additional optional ingredients can also be included in the product, such as binders, cleaning agents, dispersants, wetting agents, dry acids, and mixtures thereof. For example, the product can further comprise a binder selected from the group consisting of sorbitol, alkali metal phosphates, and mixtures thereof. A particularly preferred binder comprises an aqueous mixture of sorbitol and an alkali metal phosphate, as described in U.S. Pat. No. 7,758,770. Examples of suitable alkali metal phosphates include those selected from the group consisting of sodium phosphates, disodium phosphates, sodium polyphosphates, potassium phosphates, potassium polyphosphates, and mixtures thereof. A particularly preferred alkali metal phosphate is sodium hexametaphosphate.

Although the above optional ingredients can be included, when a chloride-free embodiment is utilized, it is preferred that none of these ingredients provide a source of chloride ions. That is, it is preferred that the product is essentially free (i.e., less than about 3% by weight chlorine, preferably less than about 1% by weight chlorine, more preferably less than about 0.5% by weight chlorine, and even more preferably about 0% by weight chlorine) of chlorine.

The moisture content of the product will preferably be from about 0.01% to about 0.3% by weight, preferably from about 0.03% to about 0.1% by weight, and more preferably from about 0.05% to about 0.07% by weight, based upon the total weight of the product taken as 100% by weight.

In one aspect, the product consists essentially of, and preferably consists of, the salt and metal chelating agent. In another embodiment, the product consists essentially of, and preferably consists of, the salt, metal chelating agent, and a binding agent.

The product of the present invention can be used in conventional water softeners according to the instructions for the particular water softener. In one embodiment, the product preferably comprises food grade salts (i.e., safe for human consumption in levels expected to be present in water treated with the product), although this is not mandatory in some embodiments. In use, the ion exchange material in the water softener becomes saturated with calcium and magnesium ions removed from the incoming water, and depleted of sodium and potassium ions. The present method of recharging the ion exchange material comprises contacting the ion exchange material (e.g., styrene copolymerized with divinyl benzene) with an aqueous solution or dispersion comprising the inventive product during the regeneration cycle of the water softening system. This replenishes the ion exchange material with sodium and potassium ions and removes the calcium, magnesium, or other ions previously removed from the incoming water. The aqueous solution or dispersion containing the inventive product will have (or lack) the same ingredients as described above with respect to the product (except in ionic form, in most instances).

It is preferred that the product be added at sufficient levels so that the aqueous solution or dispersion comprises from about 1% to about 50% by weight salt, preferably from about 10% to about 40% by weight salt, and more preferably from about 20% to about 30% by weight salt, based upon the total weight of the solution or dispersion taken as 100% by weight. (It will be understood by one of ordinary skill in the art that the salt would actually be present in the aqueous solution or dispersion as its ionic constituents, and that referring to "salt" herein in such a context is for ease of reference. In many instances, this will also be true of the metal chelating agent.) Furthermore, the aqueous solution or dispersion should comprise from about 0.0001% to about 20% by weight metal chelating agent, preferably from about 0.001% to about 10% by weight metal chelating agent, and more preferably from about 0.005% to about 0.05% by weight metal chelating agent, based upon the total weight of the solution or dispersion taken as 100% by weight. In one embodiment, the metal chelating agent present in the aqueous solution or dispersion is less than about 75 ppm, preferably less than about 50 ppm, and more preferably from about 5 ppm to about 35 ppm, based on the salt.

The aqueous solution or dispersion can be formed in several ways. The salt and metal chelating agent could be combined independently (separately) in the water, either one after the other, or at the same time. The optional ingredients could be similarly added to the water. Or, they could be added together, either as a "loose" mixture/dispersion/suspension (depending upon whether any of the ingredients are in liquid form) or as a self-sustaining body.

Next, water to be treated is contacted with the ion exchange material in the softener that has been regenerated or recharged with the product so that the metal ions of the salts will replace the undesirable ions present in the water. Thus, by following the present invention, at least about 80% by weight, preferably at least about 85% by weight, preferably at least about 90% by weight, and preferably at least about 95% by weight metal ion removal is achieved. More particularly, at least about 90% by weight, preferably at least about 95% by weight, and more preferably at least about 99% by weight calcium ions are removed, and at least about 95% by weight, preferably at least about 98% by weight, and more preferably at least about 99% by weight magnesium ions are removed. The percentages by weight are determined by comparing the quantity of the particular metal ions in the conditioned water to that in the water immediately prior to conditioning, and determining the percent of metal ions removed.

Furthermore, by following the present invention, at least about 80% by weight, preferably at least about 85% by weight, preferably at least about 90% by weight, and preferably at least about 95% by weight removal of the metal-containing material is achieved. More particularly, at least about 90% by weight, preferably at least about 95% by weight, and more preferably at least about 99% by weight calcium-containing material (e.g., calcium carbonate) is removed, and at least about 95% by weight, preferably at least about 98% by weight, and more preferably at least about 99% by weight magnesium-containing material (e.g., magnesium carbonate) is removed. The percentages by weight are determined by comparing the quantity of the particular metal-containing material in the conditioned water to that in the water immediately prior to conditioning, and determining the percent removed. Thus, the resulting softened water comprises sodium and potassium ions (in place of the calcium and magnesium ions found in the untreated water).

Advantageously, the present invention has a significant advantage over the prior art in that the efficiency of the inventive product is dramatically improved over prior art products when utilized under the same operating conditions and in similar quantities. In other words, the above metal ion and metal-containing removal rates can be achieved using smaller quantities of salt when following the invention. The inventive methods result in at least about 50% more metal ions being removed, preferably at least about 65% more metal ions being removed, more preferably at least about 80% more metal ions being removed, and even more preferably at least about 100% more (i.e., at least about double the amount of) metal ions being removed as compared to the same salt products and salt quantities being utilized under the same conditions (in other words, a "control"), but in the absence of the metal chelating agent. This increase can be referred to as the "percent gain in efficiency" and is calculated by $$\left(\frac{(\text{Inventive Amount}) - (\text{Comparative Amount})}{(\text{Comparative Amount})}\right) \times 100,$$

where:
"Inventive Amount" refers to the amount of target metal ions removed by a solution including a metal chelating agent according to the invention; and
"Comparative Amount" refers to the amount of target metal ions removed by a solution that does not include a metal chelating agent.

This calculation is illustrated further in Example 4.

It will be appreciated that increasing the efficiency of water softener regenerants will reduce the amounts of unwanted sodium, potassium, and chloride in discharge water. However, additional environmental benefits are associated with increasing the efficiencies of softener regenerants. For instance, fewer sodium and chloride ions would be discharged into lakes, streams, and reservoirs. Additionally, increasing the efficiency of a regenerant would also mean that the regenerant would last longer in the brine tank, since less would be needed for each regeneration cycle. Since it lasts longer, the consumer would benefit since they wouldn't have to purchase and apply the regenerant as often. Additionally, products that are more efficient could be packaged into smaller bags. For example, a water softener regenerant that is sold in a 40-lb bag requires a certain amount of plastic. Increasing the efficiency by only 30% would mean that only 28 lbs of product would be required if practicing the present invention. Reducing the weight of the regenerant from 40 lbs to 28 lbs would result in an attendant reduction in the amount of plastic needed per bag of regenerant, effectively reducing its carbon footprint. Furthermore, lighter bags would put less strain on a consumer's joints, making them easier to carry.

EXAMPLES

The following examples set forth preferred methods in accordance with the invention. It is to be understood, however, that these examples are provided by way of illustration and nothing therein should be taken as a limitation upon the overall scope of the invention.

Example 1

The experiments of Example 1 were performed in laboratory scale water conditioners. Conditioners were filled with 250 mL of Culligan® Cullex® water softening resin (Benzene, Diethyl-, Polymer with ethenylbenzene and ethenylethylbenzene sulfonated sodium salt). Full-sized water conditioners are typically filled with one cubic foot ($ft^3$) of cation exchange resin. Since one liter is equivalent to 0.053 $ft^3$, 250 mL equates to 0.0088 ft.

To wet the resin, 250 mL of ultrapure water were poured through each conditioner, followed by 1.25 L of tap water. The hardness of the influent tap water was 290 ppm, as measured with A Taylor Service Complete [High] test kit showed the hardness of the influent tap water was 290 ppm.

An experiment conducted in a bench top conditioner compared the performance of 500 mL of a 1:4 dilution of sodium chloride brine (100 mL brine+400 mL water) with 500 mL of a 1:8 dilution (50 mL brine+450 mL water). The brine diluted 1:8 also contained 100 ppm of low molecular weight PAA. The third bench top conditioner was treated with an aqueous solution containing only 100 PAA. A Taylor Test Kit was used to measure the hardness as $CaCO_3$ in the effluents and the results are shown in Table 1. These data demonstrate that the calcium chelator (PAA) allowed the brine to remove 23% more hardness than expected based on its sodium concentration (Table 1). That is, 800 ppm of hardness was removed instead of the expected 650 ppm. In this case, only 650 ppm hardness was expected since only half (50 mL) as much brine was used.

TABLE 1

Test Kit Measurements of Hardness removed by NaCl brine with PAA.

| SAMPLE | ACTUAL $CaCO_3$ PPM | PREDICTED $CaCO_3$ PPM | % DIFFERENCE |
|---|---|---|---|
| NaCl (100 mL brine) | 1300 | 1300 | — |
| NaCl (50 mL brine) + 100 ppm PAA | 800 | 650 | +23.07 |
| 100 ppm PAA (no brine) | 0 | 0 | 0 |

ICP (Inductively Coupled Plasma) data was generated (see Table 2), and it corroborated the results with the Taylor Test Kit. Almost 28% more calcium was removed when PAA was present than expected based on the amount and concentration of $Na^+$ in the brine. Also, in the absence of brine, PAA was ineffective as an ion exchange regenerant. This Example demonstrates a significant advantage of using a calcium binding agent to chelate calcium ions removed from the exchange resin by the influent sodium ions.

TABLE 2

Ions measured with ICP.

| SAMPLE | $NA^+$ (PPM) IN BRINE | ACTUAL $Ca^{2+}$ PPM IN EFFLUENT | PREDICTED $Ca^{2+}$ PPM IN EFFLUENT | % DIFFERENCE |
|---|---|---|---|---|
| NaCl (100 mL brine) | 46,560 | 3,716 | 3,716 | — |
| NaCl (50 mL brine) + 100 ppm PAA | 23,280 | 2,370 | 1,858 | +27.6 |
| 100 ppm PAA (no brine) | 0 | 2.2 | 0 | 0 |

Based on the surprising synergy between a chloride-containing salt and the calcium chelating agent disclosed in Example 1, a subsequent experiment was conducted using the bench top water softeners. This experiment examined the effect of 1,000 ppm AR 921-A+5 ppm VF-1 on $Na_2SO_4$ brine (500 mL) containing on regeneration efficiency. As with Example 1, the efficiency was based on the relative amounts of $Ca^{2+}$ removed from the resin in comparison to the concentration of $Na^+$ in the brine. The results (Table 3) show that calcium chelators can also increase the efficiency of the regenerant even when using non-halide salts such as $Na_2SO_4$. This confirms that the efficiency gains are linked to the cationic component (i.e., $Na^+$ or $K^+$) of the salt, whether the anionic portion contains chloride or not.

TABLE 3

Test Kit Measurements of Hardness Removed.

| SAMPLE | Na (PPM) IN BRINE | $Ca^{2+}$ PPM IN EFFLUENT | EXPECTED $Ca^{2+}$ PPM IN EFFLUENT | % DIFFERENCE |
|---|---|---|---|---|
| NaCl brine | 16,550 | 4276 | 4276 | — |
| $Na_2SO_4$ brine | 7,998 | 2853 | 2066 | +38 |

Example 3

Previous examples confirmed that calcium chelating agents can significantly increase the efficiency of chloride-containing regenerants in lab scale water softeners. But, softener studies of this Example, as well as all subsequent Examples, were performed in a full-sized softener with a Culligan® Medallist Series™ control module and Culligan® Cullex® water softening resin. The housing contained about 0.85 $ft^3$ of Cullex resin.

The resin was regenerated with a formulation consisting of 99.5% anhydrous sodium sulfate and 0.5% AR 921 A that was pelletized in the laboratory. The equipment used to pelletize the formulation was a Komarek B050. The B050 roller press is designed specifically for research and development briquetting or compacting granulated materials. The sodium sulfate was heated in a convection oven to approximately 225° F., and the material was then mixed with 0.5% AR 921A using a KitchenAid® mixer before being compacted.

The water softener was connected to three different brine tanks with valves to determine the regenerant used. One of the brine tanks was filled with calcium chloride and used to saturate the resin prior to regeneration. The calcium chloride brine was prepared by adding about 5 kg of calcium chloride flake to about 20 liters of water. The other brine tanks were filled with either sodium chloride or the sodium sulfate formulation. The sodium sulfate and sodium chloride pellets were allowed to brine (i.e., dissolve) for no less than three days before regenerating the resin. For the purposes of this Example, sodium chloride served as a control regenerant with no enhanced regeneration efficiency.

The water softener system was set as follows: back wash—10 minutes (~1 gal/min), slow brine regeneration—60 minutes (~0.4 gal/min), and fast rinse—21 minutes (~1 gal/min) for all experiments. The effluents from these cycles were collected in a 100-gallon, plastic tank and analyzed for sodium and calcium contents via ICP. The softener experiments began by adding about 60 lbs. of a pelletized formulation consisting of 99.5% anhydrous sodium sulfate and 0.5% AR 921A to one of the brine tanks. By contrast, 50 lbs. of sodium chloride was added to the other brine tank.

Tables 4 and 5 show the data generated with sodium sulfate/AR 921 A blend and sodium chloride regenerants, respectively. Clearly, the sodium sulfate/polyacrylate blend regenerated the exchange resin (Table 4) with considerably less sodium than the sodium chloride salt control (Table 5).

TABLE 4

Regeneration with Sodium Sulfate with PAA.

| REGENERATION NUMBER | Na$^+$ (PPM) IN EFFLUENT | Ca$^{2+}$ (PPM) IN EFFLUENT |
|---|---|---|
| 1 | 2911 | 3215 |
| 2 | 1676 | 2670 |
| 3 | 1415 | 2797 |
| 4 | 2087 | 3310 |
| 5 | 2640 | 3481 |
| 6 | 2071 | 3248 |
| 7 | 927 | 2333 |

TABLE 5

Regeneration with Sodium Chloride (Control).

| REGENERATION NUMBER | Na$^+$ (PPM) IN EFFLUENT | Ca$^{2+}$ (PPM) IN EFFLUENT |
|---|---|---|
| 1 | 7892 | 3589 |
| 2 | 7668 | 3594 |

Another notable difference was that the sodium sulfate blend yielded six complete regenerations while the sodium chloride control provided only two complete regenerations. Although ten fewer pounds of sodium chloride were used, it dissolved faster and produced significantly higher concentrations of sodium (Na$^+$) relative to sodium sulfate. The lower sodium concentrations reflect the difference in solubility between sodium sulfate and sodium chloride. Specifically, sodium chloride's solubility at room temperature is approximately 1.8 times greater than that of sodium sulfate (Table 6). This explains why the effluent from the sulfate brine had a significantly lower sodium concentration and also highlights another novel aspect of the invention. That is, the use of a sodium or potassium salt that dissolves more slowly than their chloride-containing counterparts will last longer in addition to being more efficient.

TABLE 6

Relative Solubilities of Sodium and Potassium Salts.

| SALT | SOLUBILITY |
|---|---|
| Sodium Chloride | 35 g/100 mL |
| Potassium Chloride | 34.4 g/100 mL |
| Sodium Sulfate | 19.5 g/100 mL |
| Potassium Sulfate | 12 g/100 mL |
| Sodium Bicarbonate | 9.6 g/100 mL |
| Di-sodium Phosphate | 11.5 g/100 mL |

Example 4

In light of the significant results achieved using the chloride-containing salts with the miniaturized water softeners of Example 1, analogous experiments were performed in the full-sized water softener of Example 3. For these experiments, solar salt was added to a brine tank filled with municipal water in order to produce saturated brine. Brine was diluted as described in Table 7 and added directly to the softener's brine tank prior to regenerating the exchange resin.

In each instance, the volume added to the brine tank was about 10 gallons. As with previous Examples, regeneration efficiency was determined by measuring the concentration of calcium in the effluent tank.

In order to assess efficiency, the ability of undiluted solar salt brine to regenerate softener resin was compared to the performance of diluted brines. In addition, some of the diluted brines were fortified with chelating agents to measure the impact on regeneration efficiency. The chelating agents were: Aquatreat® 921 A (polyacrylic acid), Versaflex One® (a specialized acrylic acid-based polymer), Versa TL® 3 Dry (sulfonated polystyrene), and citric acid. The large scale results shown in Table 7 corroborate the findings of Example 1. Specifically, brine diluted to 25% of its original strength, containing as little as 10 ppm of PAA, removed significantly more Ca$^{2+}$ than expected. This is even more unexpected in light of Table 2, which demonstrated that PAA was completely ineffectual as a standalone regenerant. Further validating the synergistic performance of the polymeric chelating agents with Group I cations, two other polymers also significantly increased the efficiency of the 25% brine solution (Table 7). Percent gain in efficiency as used herein is calculated by subtracting the amount of calcium removed by the 25% brine solution from the 25% brine solutions containing the calcium binding agents. For instance, 25% brine removed 1263 ppm calcium while the same strength brine with 10 ppm PAA removed 2324 ppm. Therefore, 2324-1263=1061. 1061/1263=0.84 or 84% additional calcium removed.

TABLE 7

Regeneration with Varying Brine Dilutions in Water Softener.

| BRINE DILUTION | CALCIUM (PPM) IN EFFLUENT | PERCENT GAIN IN EFFICIENCY |
|---|---|---|
| Undiluted NaCl Brine | 3248 | — |
| Brine diluted to 75% (3 parts brine to 1 part water) | 2238 | — |
| Brine diluted to 50% (1 part brine to 1 part water) | 1869 | — |
| Brine diluted to 25% (1 part brine to 3 parts water) | 1263 | — |
| Brine diluted to 25% + 500 ppm PAA | 2126 | 68% |
| Brine diluted to 25% + 50 ppm PAA | 2164 | 71% |
| Brine diluted to 25% + 25 ppm PAA | 2614 | 106% |
| Brine diluted to 25% + 10 ppm PAA | 2324 | 84% |
| Brine diluted to 25% + 25 ppm VersaFlex One | 2608 | 106% |
| Brine diluted to 25% + 25 ppm Versa TL3 | 2925 | 132% |

We claim:

1. A product capable of regenerating an ion exchange material in a water softening system by replenishing said ion exchange material with sodium and/or potassium ions and removing calcium and/or magnesium ions from said ion exchange material, said product consisting essentially of a metal chelating agent intermixed with a salt, wherein:
said metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis(o-aminophenoxy) ethane-N,N,N',N'-tetraacetate, sulfonated polycarboxylate copolymers, polymethacrylate, and mixtures thereof, and is present at levels of less than about 75 ppm, based on said salt; and said salt is selected from the group consisting of NaCl, KCl, $K_2SO_4$, $NaHCO_3$, $Na_2SO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof, said product being a solid.

2. An aqueous dispersion or solution capable of regenerating an ion exchange material in a water softening system by replenishing said ion exchange material with sodium and/or potassium ions and removing calcium and/or magnesium ions from said ion exchange material, said aqueous dispersion or solution consisting essentially of a metal chelating agent and a salt, wherein:

said metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis(o-aminophenoxy)ethane-N,N,N',N'-tetraacetate, sulfonated polycarboxylate copolymers, polymethacrylate, and mixtures thereof, and is present at levels of less than about 75 ppm, based on said salt; and said salt is selected from the group consisting of NaCl, KCl, $K_2SO_4$, $NaHCO_3$, $Na_2SO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof.

3. A product capable of regenerating an ion exchange material in a water softening system by replenishing said ion exchange material with sodium and/or potassium ions and removing calcium and/or magnesium ions from said ion exchange material, said product consisting essentially of a metal chelating agent intermixed with a salt, wherein:

said metal chelating agent is selected from the group consisting of sodium citrate, potassium citrate, sodium succinate, potassium succinate, aspartate, maleate, ethylene glycol tetraacetate, polymerized amino acids, 1,2-bis(o-aminophenoxy)ethane-N,N,N',N'-tetraacetate, sulfonated polycarboxylate copolymers, polymethacrylate, and mixtures thereof, and is present at levels of less than about 75 ppm, based on said salt; and said salt is selected from the group consisting of NaCl, KCl, $K_2SO_4$, $NaHCO_3$, $Na_2SO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof, said product being a solid.

4. A product capable of regenerating an ion exchange material in a water softening system by replenishing said ion exchange material with sodium and/or potassium ions and removing calcium and/or magnesium ions from said ion exchange material, said product consisting essentially of a metal chelating agent intermixed with a salt, wherein:

said metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis(o-aminophenoxy)ethane-N,N,N',N'-tetraacetate, sulfonated polycarboxylate copolymers, polymethacrylate, and mixtures thereof, and is present at levels of less than about 75 ppm, based on said salt; and said salt is selected from the group consisting of $K_2SO_4$, $NaHCO_3$, $Na_2SO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof, said product being a solid.

5. An aqueous dispersion or solution capable of regenerating an ion exchange material in a water softening system by replenishing said ion exchange material with sodium and/or potassium ions and removing calcium and/or magnesium ions from said ion exchange material, said aqueous dispersion or solution consisting essentially of a metal chelating agent and a salt, wherein:

said metal chelating agent is selected from the group consisting of sodium citrate, potassium citrate, sodium succinate, potassium succinate, aspartate, maleate, ethylenediamine tetraacetate, ethylene glycol tetraacetate, polymerized amino acids, 1,2-bis(o-aminophenoxy)ethane-N,N,N',N'-tetraacetate, sulfonated polycarboxylate copolymers, polymethacrylate, and mixtures thereof, and is present at levels of less than about 75 ppm, based on said salt; and said salt is selected from the group consisting of $K_2SO_4$, $NaHCO_3$, $Na_2SO_4$, $NaH_2PO_4$, $KHCO_3$, $KH_2PO_4$, $K_2HPO_4$, $K_3PO_4$, $Na_3PO_4$, $Na_2CO_3$, $K_2CO_3$, and mixtures thereof.

* * * * *